US011017683B2

(12) United States Patent
Brown

(10) Patent No.: US 11,017,683 B2
(45) Date of Patent: May 25, 2021

(54) ELECTRONIC VIDEO EV-BOOK USING FLEXIBLE VIDEO SCREENS

(71) Applicant: James Curran, IV, Bakersfield, CA (US)

(72) Inventor: Wallace W. Scott Brown, Bakersfield, CA (US)

(*) Notice: Subject to any disclaimer, the term of this patent is extended or adjusted under 35 U.S.C. 154(b) by 244 days.

(21) Appl. No.: 16/178,523

(22) Filed: Nov. 1, 2018

(65) Prior Publication Data
US 2020/0143696 A1 May 7, 2020

(51) Int. Cl.
G09G 5/00 (2006.01)
G09B 5/06 (2006.01)
G06F 1/16 (2006.01)
G09G 3/3208 (2016.01)
G06F 3/02 (2006.01)
H02J 7/00 (2006.01)

(52) U.S. Cl.
CPC .......... *G09B 5/062* (2013.01); *G06F 1/1616* (2013.01); *G06F 1/1635* (2013.01); *G06F 1/1647* (2013.01); *G06F 1/1652* (2013.01); *G09G 3/3208* (2013.01); *G06F 3/0202* (2013.01); *G09G 2330/026* (2013.01); *G09G 2380/02* (2013.01); *G09G 2380/14* (2013.01); *H02J 7/0042* (2013.01)

(58) Field of Classification Search
None
See application file for complete search history.

(56) References Cited

U.S. PATENT DOCUMENTS

| 5,417,575 | A | * | 5/1995 | McTaggart | B42D 1/006 434/317 |
| 8,319,725 | B2 | * | 11/2012 | Okamoto | G09G 3/2096 345/107 |
| 8,613,061 | B2 | * | 12/2013 | Dvorak | G06F 1/1647 380/282 |
| 9,361,853 | B2 | * | 6/2016 | Yamazaki | G06F 1/1616 |
| 9,996,115 | B2 | * | 6/2018 | Yamazaki | G09G 3/20 |
| 2007/0195009 | A1 | * | 8/2007 | Yamamoto | G06F 3/0412 345/1.1 |
| 2008/0076103 | A1 | * | 3/2008 | Wallace | G06F 1/1616 434/317 |

(Continued)

Primary Examiner — Sunit Pandya

(57) ABSTRACT

An Electronic Video ev-Book of design and manufacture resolving problems of loading undesirable internet content in said book by providing means to eliminate downloading text and graphical images from the internet. The claimed invention differs from existing e-reader products as an ev-Book of flexible QLED and like video screen e-Paper pages displaying internal memory content and eliminating internet communication components. An Electronic Video ev-Book in which the minimum required electronic memory, processing capacity and video capability for all video pages is contained within embedded electronic semiconductor digital operating mini-CPU Central Processing Units. The ev-Book's purposely specified and installed components eliminate user manipulation and changing of programmed content as compared with the ease of reloading personal computer e-readers. The invention claims an ev-Book exterior cover housing a spine harness comprising power batteries and positioning and binding of the interlocking video flexible e-paper pages each containing a mini-CPU for realistic experiences.

11 Claims, 12 Drawing Sheets

Illustrates Electronic Video ev-Book with example of available oversize ev-Book cover.

(56) References Cited

U.S. PATENT DOCUMENTS

2016/0070366 A1\* 3/2016 Pinheiro De Figueiredo ..............
G06F 3/0346
345/156
2016/0259507 A1\* 9/2016 Miller ................... G06F 3/0483

\* cited by examiner

FIG. 1 Illustrates Electronic Video ev-Book with example of available oversize ev-Book cover.
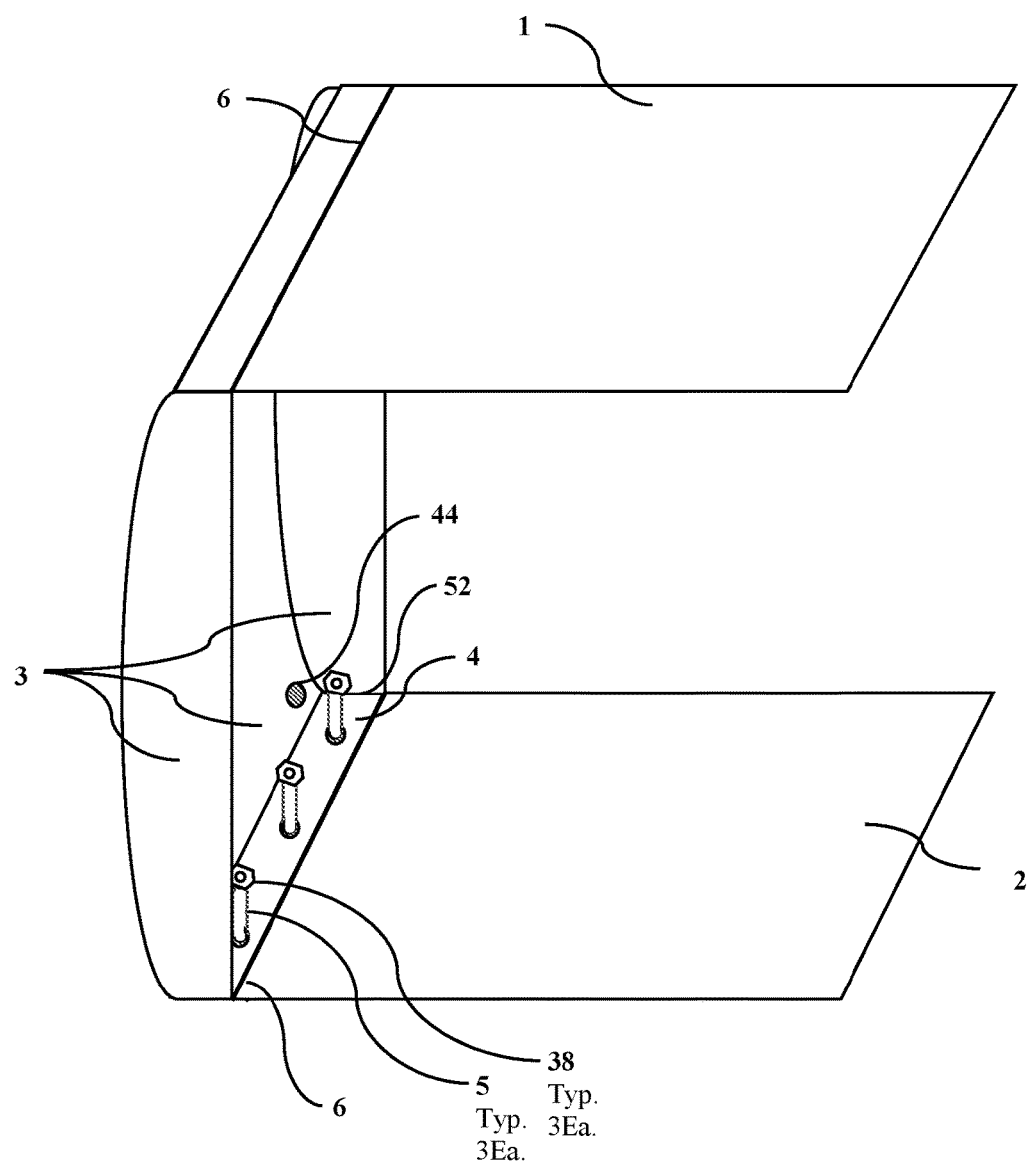

FIG. 2A Illustrates Electronic Video ev-Book Embodiment 1, single electronic flexible video screen.
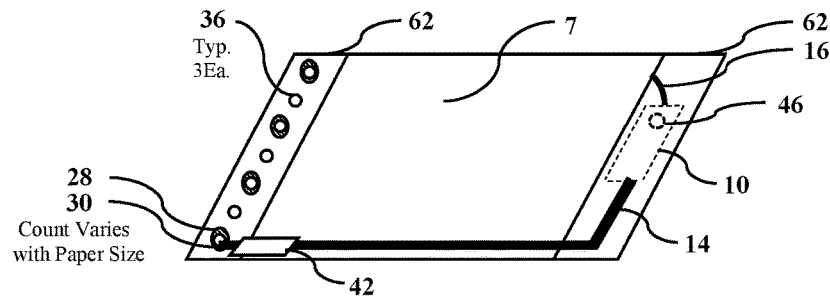
FIG. 2B Illustrates Electronic Video ev-Book Embodiment 2, single electronic flexible video screen page.
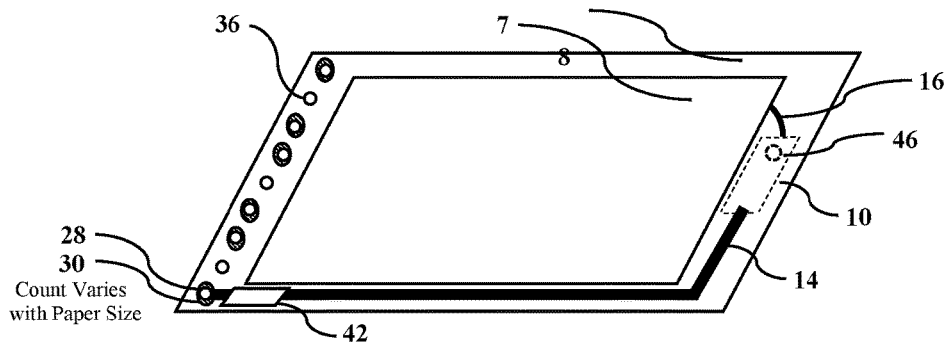
FIG. 2C Illustrates Electronic Video ev-Book Embodiment 3, electronic flexible video screen with stronger holder.
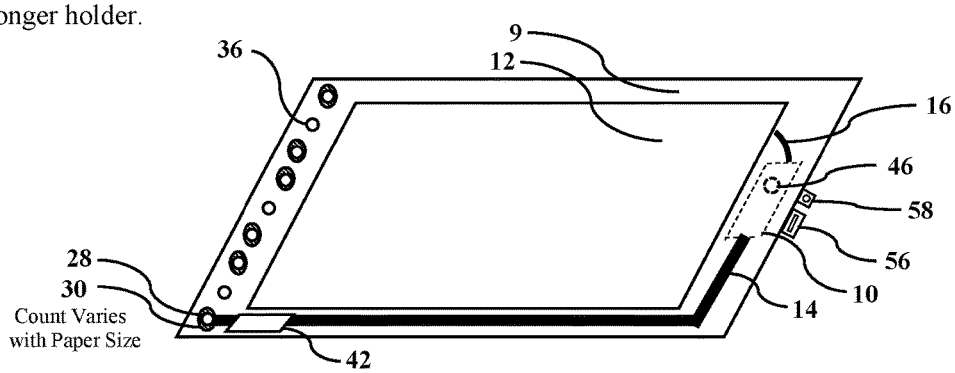

FIG. 3 Illustrates Electronic Video ev-Book six Lithium-Ion rechargeable batteries and battery clip holders.
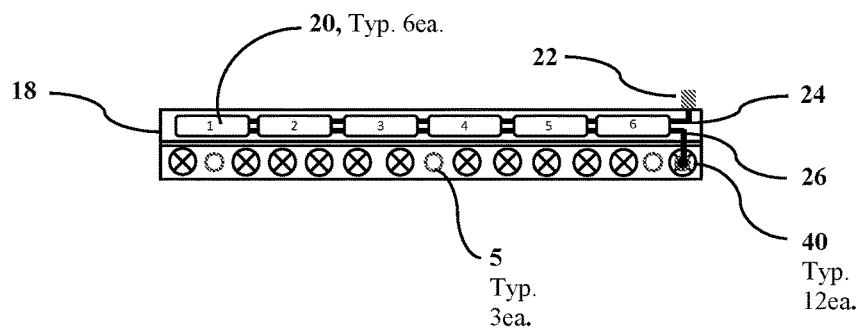

FIG. 4 Illustrates Electronic Video ev-Book Power Battery and Electronic Flex Video Page Containment Harness.
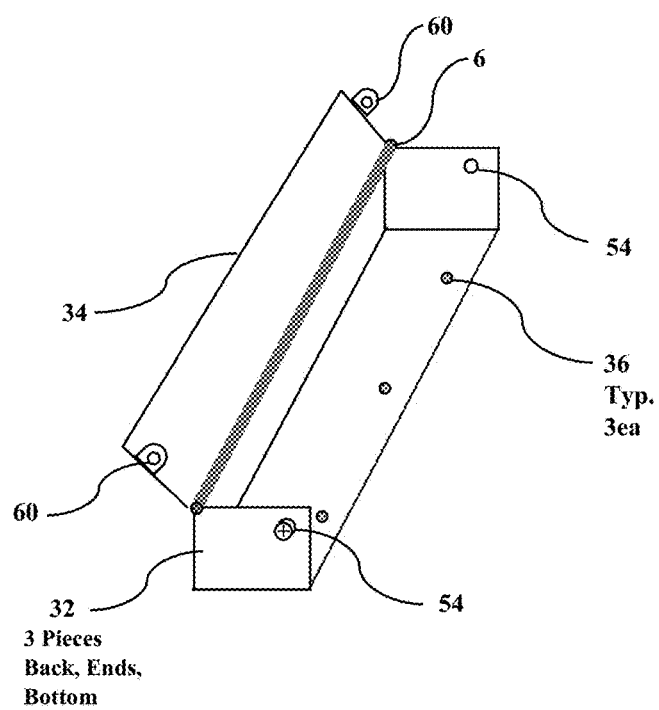

FIG. 5 Illustrates Electronic Video ev-Book Embodiment 2 with large CPU Central Processor and GPU Processor.
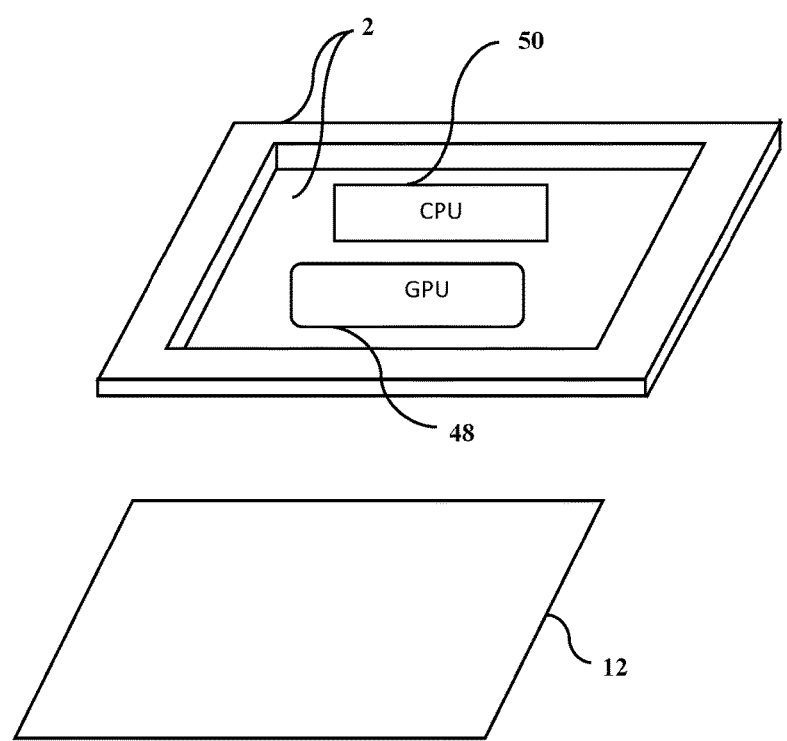

FIG. 6 Illustrates Electronic Video ev-Book Embodiment 3 with high page count and high processing capacity CPU Central Processor.
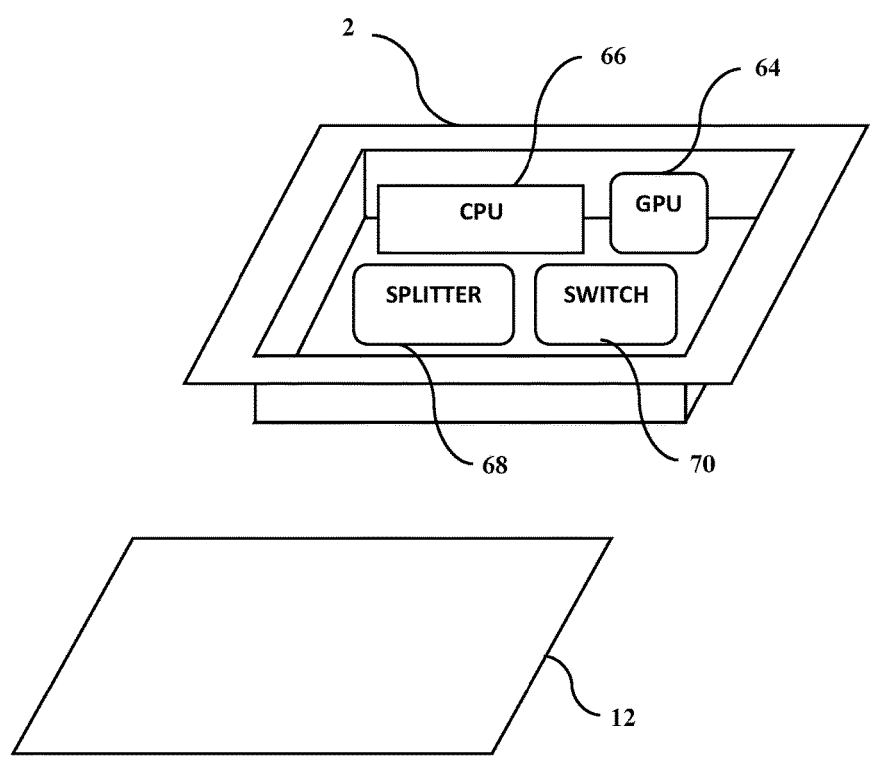

FIG. 7 Illustrates Electronic Video Screen ev-Book Embodiment 1 showing fully assembled small size Book.

FIG. 8 Illustrates Electronic Video Screen ev-Book Embodiment 3 showing fully assembled large Book with cover.
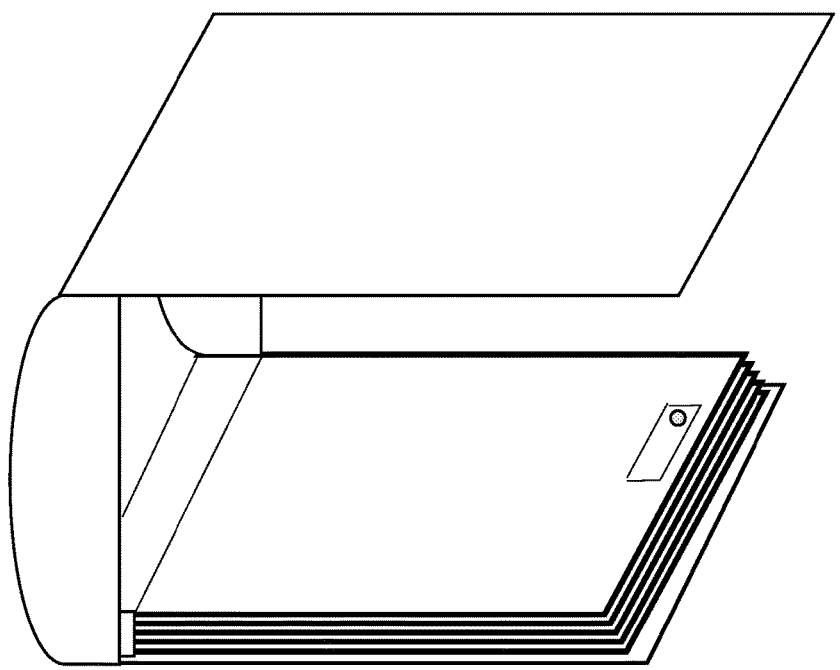

FIG. 9 Illustrates Electronic Video Screen ev-Book Embodiment 1, 2 and 3 showing two fully assembled ev-Books, one capable of containing twenty-five Pages in comparison to small size.
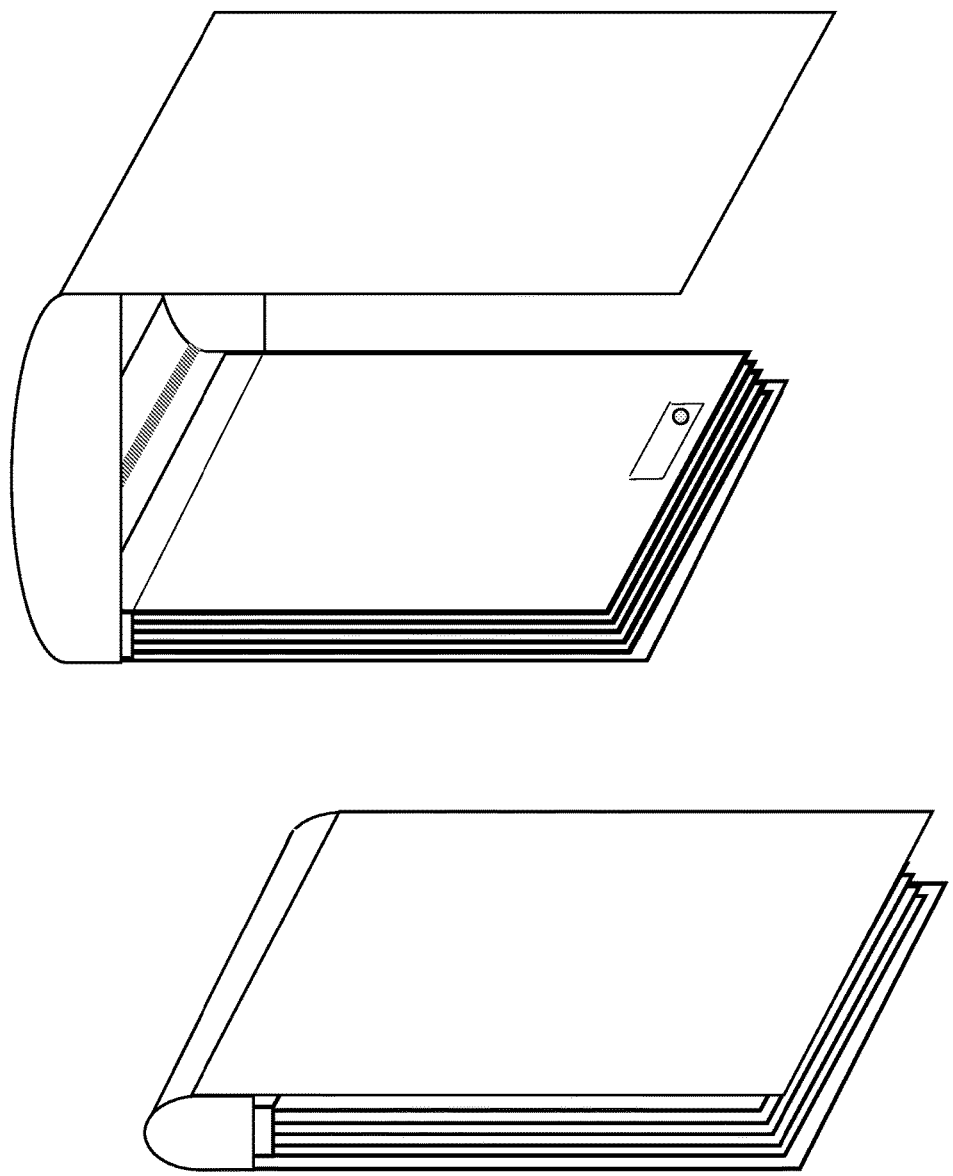

FIG. 10 Illustrates Electronic Video Screen ev-Book Embodiment 1 and 2 showing small ev-Book Block Diagram of electronic components.
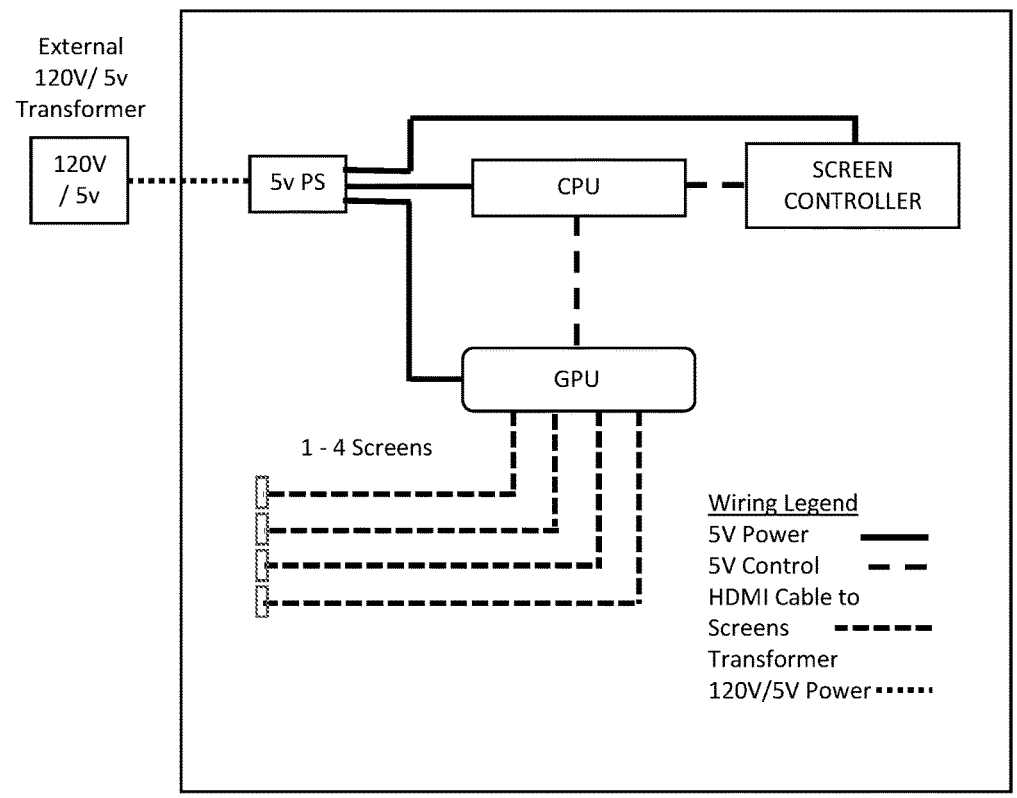

FIG. 11 Illustrates Electronic Video Screen ev-Book Embodiment 3 showing large ev-Book showing large page count ev-Book Block Diagram of electronic components.
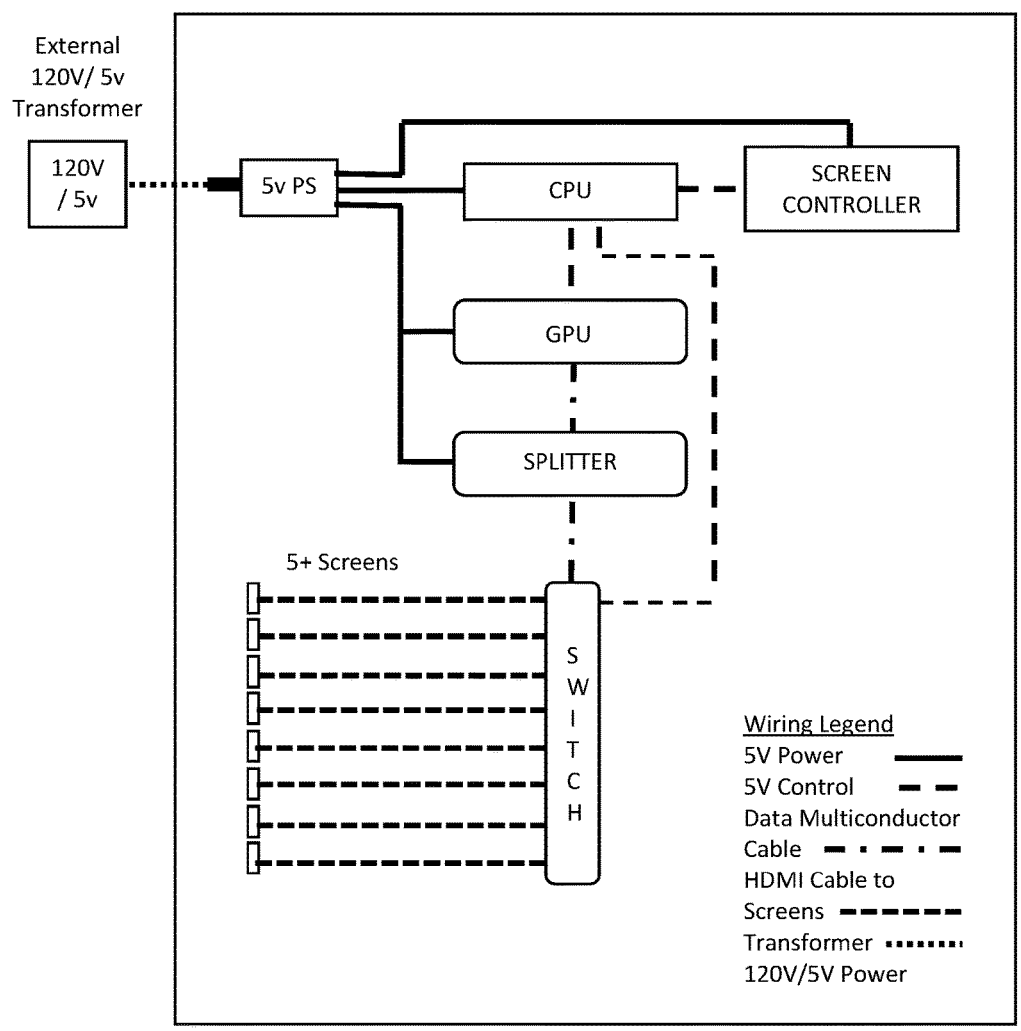

FIG. 12 Illustrates Large Size Electronic Video Screen ev-Book for Patent Front Page.
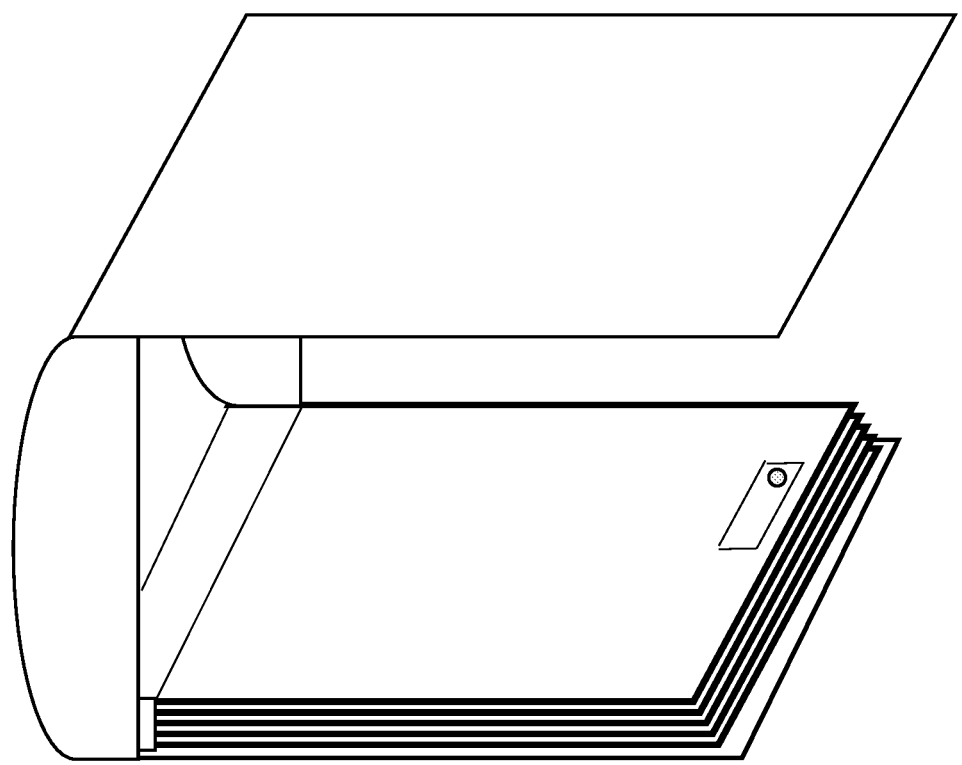

ELECTRONIC VIDEO EV-BOOK USING FLEXIBLE VIDEO SCREENS

This application claims the benefit of Provisional Application Ser. Nos. 62/697,768, filed 2018, Jul. 13 by present inventors.

BACKGROUND ART

In the two preceding decades from 1998 through the first half of 2018, the manufacture and use of e-Reader books has become quite famous, well accepted, with high online and retail sales. The two keenly developed and primary e-reader/e-books with fixed glass enclosed viewing screens using apps for personal computer products quickly evolved between 2004 and 2007. The primary problem with the majority of electronic readers and e-reader devices is the inability to limit where and what the reader can browse, view and do should the reader stray off to Internet sites not rated for families and teenagers. This practice demands guidance for use as this maneuvering can create infringement and cost burdens if and when text or videos properties by others are illicitly brought into the originating device for display. This upsetting situation of carelessly wandering off results in distraction of the reader(s) from intended content and can present improper content. The preprogramed Electronic Video ev-Book prevents all of these mishaps.

Other significant prior art attributes demonstrated in the referenced prior art patent(s) that bring about concern are the extensively complex engineering and design features and hardware that have been introduced to prevent miss-operation of logic, text feed and movement of files across screens. The resulting composite nature of their semiconductor construction, assembly, and programming (a) raise the factors of first cost due to multiple components and fabrication steps, (b) reduced operating efficiencies due to logic checks, loop backs and interlocks that have always slowed down performance of these types of computerized devices, and (c) difficult user interface screen maneuvers requiring advanced user understanding and activation.

One referenced prior art device recently granted a patent required three sequential re-filings with the patent office as the inventors continued to overcame invention design issues that caused the electronic prototype to fault out of operation. The subject electronic ev-Book of this filing is comprised of simple physical and electronic devices commercially available for assembly and testing for the final desired action of video presentation on multiple flexible screens.

As a result this filing for an electronic video ev-Book is not encumbered as prior art can be with internal electronic page turning procedures. The reader's satisfaction for a page turning ev-Book experience is fulfilled by purposefully designing and building said ev-Book for ease of use and low internal electronic logic burden. A substantial percentage of all prior art eReader devices allow searching of the World Wide Web and downloading of any and all content; so much so this is a primary feature amongst them. Their only means of safeguard is parental guidance, software locks, and login passwords to prevent subject matter from being loaded in unlimited selection and quantity without authorization.

The goals of this ev-Book filing in contrast to prior art is for it to be fully functional to display within a book responsibly chosen text, graphics and motion on moveable pages from small 8 inch by 8 inch to extra-large size 24 inch by 36 inch without requiring the extra features of processing capacity of more expensive hand held computerized reader devices and to provide beautiful illuminated pages of text, graphics and motion to stimulate readers' minds of all ages with rewarding reading and visions of video graphics.

DISCLOSURE OF INVENTION

The primary advantage of said Electronic Video Book in opposition to the predominance of electronic readers and e-reader devices is the ability to readily limit what the reader can see and do, such that no reader can stray off from the designed ev-Book's limits and preselected resident programming unto internet sites not intended for use, nor will the user ever garner any unwanted cost by inadvertently copying text or unauthorized video into his or her subject reader device for display. This issue spurned by unwanted internet ads can readily happen with a typical fully configured computer like e-Reader connected to the outside world of business. The user will not have a path to be distracted away from the intended content and the simplicity of a given or assigned presentation which is inherently protected and maintained.

This invention an Electronic Video ev-Book resolves the issue by not including an internet connection and in place display only specific video content contained in the memory of each page's digital operating system. Additionally the text, pictures and video motion are displayed on flexible video screen pages such when a video screen page is turned like a print book page one to the next, the page turning action interrupts power to the turned page shutting that display off, and turning the next page's display on.

The Electronic Video ev-Book improves on conventional printed and e-reader books by providing only the selected sequential page-by-page content purchased with the ev-Book and loaded for use by the managing and supervising entities with subject matter that has been requested, required or purchased. The electronic video ev-Book can be re-loaded at whatever intervals desired by the supervisor for changing content such as a different sequential lesson, an entirely new lesson, or an instruction set and doing so without extra features of processing capacity of more expensive hand held computerized reader devices. The electronic memory content, processing capacity and video playing for each page is contained within a miniaturized GPU, graphic processing unit, located in the specific electronic video ev-Book page pocket or if digital content is extensive in a cavity in the ev-Book back cover.

It is an object of an embodiment of the disclosed invention to provide an environmentally friendly and easily manufactured electronic video ev-Book eliminating the use of paper pages and ink, and instead in their place using electronic e-paper of QLED, OLED, LCD, and HDR technology readily assembled and operable with existing technology using commercially manufactured electronics and recycled plastic technology parts and subassemblies with a goal to provide this video reader as text ev-Books for public education in preschool, elementary, middle school, high school, colleges, universities and technical colleges and as work related ev-Book assemblies for manufacturing, industrial and commercial construction plan sets, store displays, and retail marketing of recreational, medical and manufacturing equipment products.

It is an object of an embodiment of the disclosed invention to assure additionally prevention of invasive virus software recognized to destroy data content as introduced without being known to the end-user as maliciously done by intruders with rouge electronic internet connections.

This object is an embodiment of the disclosed invention including a protective ev-Book cover, one or more of flexible video screen(s), one or more shear lightweight plastic video screen frame protective holder(s), a video screen(s) spine binding harness, a battery spine subassembly in the binding harness, electrical power circuit board in spine harness, an embedded video driver-control semiconductor circuit board with soft touch on-off button(s), hard-coded firmware logic control software with screen touch sensitive capability, and USB-Smartcard(s) for application related added memory storage and transfer.

Accordingly to the electronic video Book of an embodiment of the disclosed invention, the individual flexible video screen page is to have a flat, square or rectangular shape with a one-sided pocket molded into screen holder with an insert slot to receive and house the requisite laminated silicone video driver-control circuit board and Smartcard which are thereby protected within the slot pocket.

Accordingly to the Electronic Video Book of an embodiment of the disclosed invention, the individual flexible screen page is to be housed in a sealed clear plastic frame that has a left-side full-length flat stiffened tab running top to bottom that is to be secured in the spine binding harness with numerous clamped male and female compression sockets with open circular center interior passageways, the total number of sockets per page is determined by the total number and size of pages.

Accordingly to the electronic video ev-Book of an embodiment of the disclosed invention, each individual flexible screen page is to be carried in an individual, full-size, clear plastic frame that has numerous clamped male and female compression sockets with open circular center interior passageways for electrical ribbon wire to pass through, whereby separate ribbon wires will carry low voltage power from the batteries to control devices and separate ribbon wire will carry communications data to and from its CPU Central Processing Unit and from the GPU Graphics Processing Unit to the screen displays.

Accordingly to the electronic video ev-Book of an embodiment of the disclosed invention, the individual flexible screen(s) is to include a flat ribbon communication wiring strip that is affixed with a Mini USB Port embedded in the right side of the video page tab for loading, reloading and changing control and content program(s) residing in the embedded video driver-control circuit board as carried out by authorized and supervising personnel.

Accordingly to the electronic video ev-Book of an embodiment of the disclosed invention, each individual flexible screen page is to contain a control switch in a pre-established position in the upper right cover screen pocket which will allow the ev-Book operator to energize and de-energize electrical power to the individual screen display page GPU, graphics processing unit, circuit board to show the intended text for the specific page, and the same switch sequentially start, pause, restart and stop the specific page's video graphics display.

Accordingly to the electronic video ev-Book of an embodiment of the disclosed invention, each individual, flexible screen page is to contain both a position detecting electrical switch and an operator manual on/off switch in series with the video screen page embedded power socket wiring to provide the ev-Book user a choice to energize the individual screen display on and off when the video screen page is open and lying flat.

Accordingly to the electronic video ev-Book of an embodiment of the disclosed invention, an ev-Book spine binding harness to contain, position and secure a video screen(s) holder tab(s) with their embedded male and female compression sockets in place and clamped in the ev-Book cover spine cavity.

Accordingly to the electronic video ev-Book of an embodiment of the disclosed invention, the spine screen page binding harness is to contain, position and secure individual batteries on the battery backboard for powering the screen display and power for control circuitry.

Accordingly to the electronic video ev-Book of an embodiment of the disclosed invention, the spine screen page binding harness is to contain, position and secure a battery charging port socket and its attendant wiring for charging the screen page display and control circuitry batteries.

SUMMARY OF THE INVENTION

Accordingly to the electronic video ev-Book of an embodiment of the disclosed invention, the multiplicity of video screen pages can be a variable number, and each video screen page can easily be flexed to turn with a spine connection movement allowing the first screen page to lay back making clearance for the second, and second laying back for the third and the like for others as consecutively turned in the ev-Book for the arrangement of all screen pages to be opened and laid back fully one over the other.

Accordingly to the electronic video ev-Book of an embodiment of the disclosed invention, each visible screen page's display content of text, graphics and video object movement can be automatically or manually started for each screen page with a multiple position soft-touch pushbutton control embedded in each individual screen, so that the text and picture visible presentation can be started by the reader/operator, and so that the video portion can be started, and be paused, and be turned off.

Further, an "electronic video screen page display" in this specification known as e-Paper and the like includes in its category a large number of light-emitting devices. The light-emitting device includes a light emitting element and in its category an element whose luminance is controlled by a current or a voltage.

Further, a "semiconductor device" in this specification and the like generally indicates a device capable of functioning by utilizing industry standard semiconductor characteristics, circuits, electro-mechanical devices and miniature electronic apparatus all being semiconductor devices.

According to an embodiment of the disclosed invention, an electronic ev-Book in which storage, retrieval and display of data and moving screen objects can be presented in the video screen pages and so presented in the customized ev-Book cover and holders in which damage and malfunction is inhibited and assured.

According to an embodiment of the disclosed invention, an electronic ev-Book in which logic is contained in a programmable CPU Central Processing Unit with solid-state memory in place of a computerized motherboard and hard-drive device allowing a simplified programmable electronic solid state controller at a corresponding reduction of cost.

BRIEF DESCRIPTION OF DRAWINGS

In the accompanying drawings:

FIG. 1 illustrating Embodiment 1 electronic ev-Book Cover illustrating an example of the electronic ev-Book cover built of three pieces comprised of the front, spine, and back cover parts hinged together.

FIG. 2A illustrating Embodiment 1 Electronic e-Paper illustrating an example of the electronic ev-Book single electronic video screen page with a screen holder tab on the left side and controller tab on the right.

FIG. 2B illustrating Embodiment 1 Electronic Paper illustrating an example of the electronic ev-Book single electronic video screen page with a four sided protective page holder.

FIG. 2C illustrating Embodiment 1 Electronic Paper illustrating an example of electronic ev-Book single electronic video screen page with full page holder, back support, and clear protective film screen cover.

FIG. 3 illustrating Embodiment 1 Lithium-Ion Rechargeable Batteries shows an example of the electronic ev-Book low voltage power and logic batteries set in place on the semiconductor power backboard.

FIG. 4 illustrating Embodiment 1 Battery plastic harness illustrates an example of the electronic ev-Book containment harness encompassing the 5 volt power and logic batteries and the video screen page(s).

FIG. 5 illustrating Embodiment 2 imbedded large CPU Central Processor and GPU in back cover cavity.

FIG. 6 illustrating Embodiment 3 shows large power CPU Central Processor and GPU in deep back cavity.

FIG. 7 illustrating Embodiment 1 shows fully assembled small size Electronic Video Screen ev-Book with a five page count which is expandable with variable sizing of snap together cover and harness.

FIG. 8 illustrating Embodiment 1 Electronic ev-Book illustrating an example of the large electronic ev-Book fully assembled with cover in the closed position and five electronic video screen pages.

FIG. 9 illustrating Embodiment 1, 2 and 3 shows two fully assembled Electronic Video Screen ev-Books one oversized with expanded cover showing interior in comparison to the small size five page content.

FIG. 10 illustrating Embodiment 1 and 2 shows small ev-Book Block Diagram of electronic components.

FIG. 11 illustrating Embodiment 3 shows large ev-Book Block Diagram of electronic components.

FIG. 12 illustrating assembled Electronic Video large size ev-Book with expanded cover and spine.

DETAILED DESCRIPTION OF PRIMARY EMBODIMENT

FIG. 12 Illustrates as an example of the assembled Electronic Video ev-Book including the multiple of video screen pages, an ev-Book in which a binding harness is provided in the spine housing a power distribution board with terminals for battery(s) and bracing attachment points for electronic video screen pages, an ev-Book in which a miniaturized video graphics control unit can be provide in the pocket of each single video screen page right-side tab.

Embodiments are herein described in detail using the drawings. Note that the present invention is not limited to the description of the embodiments, and it is apparent to those skilled in the art that the elements and details can be modified in various ways without departing from the essence and execution of the present invention disclosed in this specification and the like.

Structures of different embodiments can be implemented in an appropriate combination.

On the description of the invention with reference to the drawings, a reference numeral indicating the same part is used in common throughout different drawings, and descriptions on the same part is omitted.

Note that emphasis, the thickness of a section of an object and of each element illustrated in drawings or in similar embodiments is often shown larger or smaller in some cases for simplicity of illustration and viewing. Embodiments of the present invention therefore are not limited in such scales.

ev-Books are unlimited in their size and page count simply by make all easily plastic molded parts and components larger and using larger sheets of flexible QLED, OLED, LCD and HDR video screen technology as they are available. The initial sizes envisioned by the format elaborated by this patent are:

| | |
|---|---|
| 8 inch H × 8 inch W × ¾ inch up to 1 inch D - | Children's reading, Picture, Lesson and textbooks |
| | Gift, Toy, Puzzles, Sports, Pre-Elementary School |
| 8½ inch × 11 inch × 1 inch up to 1½ inch | Middle & High School, College, Lessons, Studies Executive Date-Planning, Product display, Training |
| 12 inch × 12 inch × 1 inch up to 2 inch | Mom's Cooking, Scrapbook, Picture, Reading, Pleasure, Crafting, Quilting, Gardening |
| 12 inch × 24 inch × 1 inch up to 2 inch | Machinery Manuals, Repair and Instruction, Travel |
| 24 inch × 36 inch × 1 inch up to 2 inch | Architectural, Hospital, Industrial, Housing 3D Plans |
| 30 inch × 40 inch × | Municipal, State, Federal Systems, Utility Operations |
| 1 inch up to 2 inch | Military Operations, Airports, Maintenance Plans |

Embodiment 1—Description Using Drawings

Embodiment 1 an example of an Electronic Video Book hereinafter known as an ev-Book will be described with reference to drawings in FIG. 1.

An Electronic ev-Book described in this embodiment includes digital data storage, retrieval and display capabilities with one or a multiple of flexible electronic video screen pages replacing traditional printed page(s), each video screen page fully self-contained with video display reproduction capability, power ribbon wiring, semi-conductor electronic board(s) with control button(s), with a harness secured in a fixed place in the ev-Book spine for containing one or more batteries and for both containing and binding one or more video screen pages, and for containing an electrical power input and charging electrical socket, with electrical distribution wiring to and from the battery(s) and to and through each stacked electronic screen page(s).

Referring to FIGS. 1, 2, 3, 4, 5 and 6 the 3-view drawings of the Embodiment 1, FIG. 1 ev-Book has a rectangular front cover 1 and rectangular back cover 2 and a multiple surface spine cover 3 with two integrally connected protective spine side covers, wherein each of these three cover elements can be readily manufactured in variable dimensional sizes capable of protecting the FIGS. 2A, 2B and 2C electronic video screens pages 7 and video screen page holder 8 and video screen full page holder 9 also manufacturable in variable dimensional sizes.

FIG. 1 shows a spine containment plate 4 mounted directly on the spine cover 3 and being held in place with threaded spine securing studs 5 passing through the spine containment harness 32 and positioning holes 36 shown in FIG. 4. Said three securing studs position and hold the harness assembly and electronic video screen pages firmly in place and is topped off with harness filler plates 52 as needed based on video screen page count and this full assembly is secured with harness stud nuts 38.

FIG. 2A Embodiment 1 shows a singular video screen 7 with a row of double sided mating male compression socket 28 and mating female compression socket 30 attached to the video screen tabs for securing video screens into each other and next in FIG. 3 the bottom row of sockets are attached into the spine harness power distribution board 18 by snapping the stack bottom page into the female base mounting sockets 40 of FIG. 4, thereby allowing the assembly of two or more screens, one on top of the other and the like to fill the harness. The harness access cover 34 is hinged down on top of stacked electronic video screen pages with filler plates 52 added as needed to fill the spine harness 32 and clamped securely in place with two harness stud nuts 38.

FIG. 2A Embodiment 1 shows one typical low voltage wireway through a double sided male screen sockets 28 and female compression sockets 30 for containing and passing electrical 5 Volt power circuit 26 up to a designated video screen pages 7 connecting to 5V power wire 14 and a second separate ribbon video HDMI cable 16 from the electronic semiconductor GPU video driver controller board 10 to the video screen page data connection. All male sockets 28 and female sockets 30 on each video screen page are identical in their interlocking design, purpose and attachment to the video screen page 7 and page holders 8, 9.

FIGS. 2, 3 and 4, Embodiment 1 show means for positioning and securing the bottom level electronic video screen page 7 FIG. 2 onto power distribution board 18 FIG. 3 to be housed in harness 32 FIG. 4.

FIG. 3, Embodiment 1 shows a 5 volt power semiconductor distribution board 18 with means for housing and securing one or more 5V batteries 20 sourcing charging power through an incoming 5V power circuit 24 and completing the electrical circuit by grounded through the attached circuit board.

FIG. 3 shows an electric power distribution board 18 to be connected to each video screen page Video Controller 10 through the board imbedded circuit 26 connected to female receiver socket 40 which in turn is connected in series with an electric ribbon wire 14 for power to be passed through the coupled plugged-in male socket 28 and through miniature electrical two-way, two position switch 42 embedded in the video screen tab so that when assembled the pages are stacked in an ev-Book with Page 1 directly on top of Page 2 so that turning Page 1 over to the left allows power to flow thru the Page 1 two way two position switch to the Page 2 energize its startup picture and text, simultaneous turning off power to page 1 and so forth.

FIG. 4 Embodiment 1 shows a low voltage electrical rated spine containment harness 32 with its framework and access lid 34 and hinge 6 for battery installation and replacement, and its spine harness positioning holes 36.

FIG. 5 Embodiment 1 and 2 shows the use of a larger GPU video driver board 48 taking on the graphics projection function removed from the controller board 10 thereby this high capacity video driver board 48 housed in a cavity in the ev-Book back cover 2 will facilitate an ev-Book of higher video screen page count.

FIG. 6 Embodiment 2 and 3 shows the use of an industry rated larger GPU video driver board 64 coupled with a video splitter 68 to divide the video memory files and in turn use of a data switch 70 for directing select content to specific video screen pages as controlled by an industry rated larger CPU 66, whereby the higher capacity video driver board 64 housed in a cavity in the ev-Book back cover 2 will facilitate an ev-Book of higher video screen page count.

Operation Embodiment 1 ev-Book Use ev-Book 1 Embodiment 1 being an Electronic Video ev-Book has three modes of user interface for operational purposes: 1.) user reading for pleasure and personal growth, 2.) for user study and work-related learning with visual repetition of sequential activity and movements in video graphics for example informing a technician how to assemble a specific jet engine piece by piece with video screen page(s) directions, diagrams and photo visuals all capable of various sizes, and 3.) for user educational purpose of interactive video screen pages as games boards and for interaction with video graphics with the intention of suitable activities for children, families and young adults of all ages.

To engage in all of these activities the ev-Book is interfaced by users holding it in their hands, laps or placing it for example on a desk, a work bench or on a tripod stand and opening the cover 1 thereby turning the first solid-state electrical micro position switch 42 on and allowing electrical power it to flow through said electrical position switch from the battery(s) 20 on the power distribution board 18 and its imbedded power circuits and into a ribbon wire up through the first male compression socket 28 passageway and intersecting female compression socket 30 passageway of the first lowest positioned video screen page in the screen stack to energize the first page controller 10 located in the top video screen page.

Upon completion of viewing video screen Page 1 the user can turn Page 1 upward and over in the usual manner of reading a book to view the Video Screen Page 2 wherein a solid-state electrical micro two position switch 42 on top of Page 1 will deactivate electric power passing through Page 1 sockets 28, 30 to the first screen and that action combined with activating a second solid state micro electrical two position switch 42 on Page 2 turning on electric power to enter the Page 2 video screen page in the stack and it controller 10 with this process repeating through the complete screen stack of pages for a given book size.

When the user is done folding all the individual video screen pages back into the ev-Book will assure each page is turn off in sequence one at a time until the entire ev-Book's video screen pages are positioned back flat against the back cover and ev-Book is powered off.

Electrical Power Control

Electronic Video Page electric power can also be turned on and off for the specific opened page with switch mechanism 46 on the face of the video screen page Controller 10 causing programmed logic in a Smartcard in the video screen page pocket to work in conjunction with said switch, whereby pushing the page switch 46 once and holding will power off the entire page, pushing the switch and holding it again turns the page back on. While the page is open and powered on pushing it twice quickly starts video graphic imbedded in the page. Pushing the switch twice quickly once again will pause the video graphic, and last it can be stopped and turned off with one added quick push.

Battery Maintenance

On board batteries 20 for the video ev-Book electrical power are re-chargeable and can be recharged by plugging in the provided accessory charger transformer to 120 VA and its 5 Volt charge cord with a single plug male end into the ev-Book Charge port 44.

Battery Replacement

Batteries can be changed out if the operation stops, and no 120 VAC electric power is available for the accessory battery charger, by opening the ev-Book front cover 1 all the way to the furthest left side position and opening the harness access cover 34 on the harness containment with a twist of two knurled harness cover screws 38 at each end, swinging the harness access cover 34 back on its hinge and lifting out the battery(s) 20 held clipped in place by spring clips. New batteries 20 slip in with some pressure on each one to spread the spring clips.

Embodiment 2—Description Using Drawings

Embodiment 2 a specific structure of the above ev-Book as illustrated in FIGS. 1, 2, 3, 4 and 5 will be described with reference to these drawings. Since this structure and it's physical features described in this embodiment are in common with that described in Embodiment 1 many attributes, points, and explanations of the common points will be omitted and different points will be described in detail in the following description. FIG. 5 as stated above applies for Embodiment 2 using a larger GPU video driver board taking on the graphics projection function removed from the controller board thereby this high capacity video driver board housed in a cavity in the ev-Book back cover will facilitate an ev-Book of higher video screen page count, The specific structure of the e-paper example of an Electronic Video Book will be described with reference to FIG. 2B a 3-View of the flexible electronic e-paper page variations.

FIG. 2B Embodiment 2 illustrates a singular video screen page flexible holder 9 as a means of providing two added sides of structural strength to contain and carry larger video screen(s) 7 whereby said holder can prevent damage while still allowing the flexible page to be fully manipulated and turned, said holder containing a row of double sided male and female compression sockets 28, 30 for securing the video screen holder into the spine harness power distribution board 18 and said holder to housing the electronic semiconductor video driver controller board 10.

FIG. 2C shows a singular video screen page holder 9 with an added protective cover flap 12 preventing damage while allowing the combination of the holder and flap to provide a thinner more flexible front cover providing a less-thick ev-Book with reduction of the cover part 1 thickness as shown in FIG. 1 and in some incidences of work environment the cover can be eliminated wherein in this configuration FIG. 2C power is turned on with the controller 10 screen switch 46 being activated by the user to energize the power feed circuitry.

Operation of Embodiment 2 ev-Book Use

To engage the ev-Book Embodiment 2 in use for reading and learning activities the ev-Book is interfaced by a user in the same fashion as described in Embodiment 1, with the inclusion that a front cover 1 becomes optional as allowed and required for select work environments.

As the structure described in this Embodiment 2 is in common with that described in Embodiment 1 features, points, and description of the common points will be omitted and different points will be described in detail in the following description.

ev-Book 1 Embodiment 2 being an Electronic Video Book has three modes of user interface for operational purposes the same as Embodiment 1.

Embodiment 2 illustrates means of providing the user with a stronger, resilient frame shown in FIG. 2B to hold the flexible video screen within the holder's four sides with a flexible back plate for the purpose of damage prevention when travelling and working in field industrial and commercial construction, manufacturing and assembly plant environments and other more strenuous occupations of physical movement and relocation requirement of the ev-Book, thereby the screen and the holder remaining flexible to allow the video screen page(s) to be turned back and forth when the book is in the open cover position exactly like the operation of Embodiment 1. Additionally the video screen holder 9 can be provide with the added flexible cover plate 14 for further protection in adverse environments with said cover plate being both hinged and removable.

Electrical Power, Battery Maintenance and Control Battery Exchange

To operate Embodiment 2 ev-Book 'Electrical Power, Battery Maintenance and Control Battery Exchange' function is interfaced and accomplished by a user in the same manner and with the same activities of the ev-Book as described in Embodiment 1.

Embodiment 3—Description Using Drawings

Embodiment 3 a specific structure of the above ev-Book as illustrated in FIGS. 1, 2, 3, 4, 5 and 6 will be described with reference to these drawings. Since this structure and it's physical features described in this embodiment are in common with that described in Embodiment 1 many attributes, points, and explanations of the common points will be omitted and different points will be described in detail in the following description.

In embodiment 3, an example of an Electronic Video Book will be described with reference to drawings for larger ev-Books as illustrated in FIGS. 5 and 6 as intended for teachers, supervisors, professionals and contractors.

An electronic ev-Book with larger operational control capacity by including an industry rated CPU Central Processing Unit 66 with added logic capability to expand on Embodiments 1 and 2 to facilitate viewing and reviewing of oversized Video screen pages for example large CAD Computer Aided Drawing plans required for industrial and commercial construction sites, production assembly lines, machinery maintenance shops, architectural plan reviews on-site. Said Embodiment 3 larger CPU 66 is to be contained in an interior enclosed cavity space of ev-Book back cover 2 and is to be supplied with larger power capacity battery(s) 20 to provide logic of directing operation of a larger capacity GPU Graphic Processing Unit 64.

An electronic ev-Book with a greater pixel density capacity GPU Graphics Processing Unit 64 working in tandem with CPU Central Processing Unit 66 to control an electronic splitter 68 to select the of chosen graphics content in ev-Book memory and an electronic switch 70 to match video content with a specific location screen page as determined by startup logic scanning the placement and count of screens in the stack on power-up.

An electronic ev-Book having both on-screen touch electronic keyboard capability and off-screen wireless keyboard and mouse pointer with required software for text imagining using wireless interface to CPU central processing unit. An electronic ev-Book with added HD High Definition 3D Video Screens, added 3D enhanced software and video driver semiconductor electronic board for added clarity of images and more dense resolution information on the video screen pages.

An electronic ev-Book with Bluetooth communications for wireless interface with CPU Central processing unit for control of video screen page display selection and operating changes and control of students' ev-Book operation start and stop, and loading data through an USB Port 56.

An electronic ev-Book with high gain stereo sound reproduction with 2 speakers and a sound port 58 for plug-in stereo headset.

An electronic ev-Book available with both molded plastic cover parts 1, 2, 3 and soft, paper-like cover parts for retail ev-Book of an intentional entertainment style of comic books for young people and with protective sheet material 9 of stronger, flexible plastic to withstand impact during handling, said covers also for use as larger shop and field operations ev-Books as illustrated in FIGS. 5 and 6.

Operation of Embodiment 3 ev-Book Use

To engage the ev-Book Embodiment 3 in use for reading and learning activities the ev-Book is interfaced by a user in the same fashion as described in Embodiment 1 and 2 with the added inclusion of features to engage the use of Embodiment 3 by teachers, supervisors and professionals for the specific purpose of training others how to use the ev-Book.

As much of the structure described in this embodiment is in common with that described in Embodiment 1 and 2, including its fabrication, features and operational points, description of the common points will be omitted and different points will be described in detail in the following description.

ev-Book 1 Embodiment 3 being an Electronic Video Book has three modes of user interface for operational purposes the same as Embodiment 1 and 2. Embodiment 3 provides the user with added-advanced electronic control and display features for expanded uses. Embodiment 3 is planned for this means of more graphics deployment that neither Embodiment 1 and 2 offer, thereby keeping the first two embodiments simple and restrictive in their use as has been outlined and explained.

Embodiment 3 is intended for well trained and professional users functioning as advanced guides such as teachers, foremen, military combat specialists, educational supervisors, and experienced techs offering basic users a variety of exercises, learning demonstrations and advanced applications within Embodiment 3 to better enable users of Embodiments 1 and 2 ev-Books.

Embodiment 3 operation with these added features allows the user to execute the ev-Book in the fashion of a personal computer, with an advanced CPU Central Processing Unit as follows: a.) An electronic ev-Book with a CPU Central Processing Unit contained in interior open space of back ev-Book cover coupled with b.) on-screen touch electronic keyboard software capability and off-screen wireless keyboard, pointing device and required software for text imagining using c.) wireless interface devices allowing the user to perform added keyboard logic operations using d.) on-board and remote split screen displays and classroom projector devices as a means to facilitate manipulation of large CAD Computer Aided Drawing sizes as required for e.) construction sites, assembly lines and machinery maintenance shops classrooms and f.) onsite trainings.

An ev-Book intended for cartographic mapping and military operations users as a large lightweight portable electronic ev-Book with added HD High Definition 3D Video Screens software and similar HD video drive semiconductor electronic board for g.) added clarity of images, more dense resolution information on the video screen pages for h.) GPS directed tactical field operations showing larger geographical areas, multiple forms of field construction, military ground and aerial equipment and munitions devices, whereby a trained computer operator can execute large 24 inch by 36 inch electronic video screen movements, easily changing pages to show other areas of strategic interest.

An ev-Book with the GPU 48 working in tandem CPU 50 controlling, selecting and switching of chosen graphics to a matched screen page in the video screen page stack using the logic on startup of scanning the placement of screens in the stack as they are held in the harness.

An ev-Book with Blue Tooth and satellite communications for cell phone conference calls and simultaneous manipulation of the CPU wireless interface for control of video screen page display selection, changes, and graphics demonstrations of mock and real-time operations, transporting, activating military devices, using voice command and control with two headgear plug-in hearing devices and multiple speakers to control the ev-Book displays such as a pilot and co-pilot interacting to provide the logic of directing operations displayed by the GPU with encrypting security software minimizing any chance of outside interference.

An ev-Book to be constructed with soft, thin flexible covers as sold in the retail industry and referred to as a comic book for intentional entertainment for young people and with protective sheets material as a under-layment 9 of stronger, flexible plastic to withstand impact during handling.

Electrical Power, Battery Maintenance and Control Battery Exchange

To operate Embodiment 3 ev-Book 'Electrical Power, Battery Maintenance and Control Battery Exchange' function is interfaced and accomplished by a user in the same manner and with the same activities of the ev-Book as described in Embodiment 1.

RAMIFICATIONS

The current invention's design, engineering and proposed manufacture of this Electronic Video ev-Book brings into being a unique step up in the lineage of a long line of printed books dating back to the year 1450 when Johannes Guttenberg imagined and built the first movable type printing press. The Video ev-Book will not replace printed books; however, it will impact the way we humans interact once again with books with pages we can turn, read and enjoy in our laps, at school, on a train or plane while travelling to historic places to photo and add digitally to our ev-Book. Guttenberg's print book has a new descendant.

The ev-Book will bring text, pictures and action to life with the help of electric light embedded in the pages, true back-lite pages as part of a real electronic book, and not 5, 10 or 20 seconds of light-speed blur of movement like so many games todays, but a video of the focused subject material along with a lesson comprised of text being present for as long as you want it open and repeated. The goal is an ev-Book for whatever subject material can be imagined, required and captured, and be able to update it with an electronic Smartcard.

CONCLUSIONS

Starting with simple concepts and goals the Electronic Video ev-Book was easily envisioned and then executed from early discussions to reality over a single year's time. The necessary parts are few and the build time is short and simple, it requires no trees to paper and will readily use recycle plastic for its major essential parts, and like most all electronic devices it can be plugged in for use and recharge as needed.

In a classroom, a work place, an assembly line, a sales showroom presentation, an operating room, and on a battlefield the way to view information will be new, complete and successful with ever-expandable, unlimited scope and page sizes as an updateable, dependable book, a favorite story, and project deliverable should be, and now will be possible.

The ev-Book as described wherein the screen pages, covers. electrical power and page harness, electrical contacts and wiring, page holders and protectors, graphics and logic processing electronics, semiconductor splitter and switching control mechanisms are to be manufactured as follows:

1.) All parts and integrated close tolerance mechanical subassemblies will be designed, engineered and shown in scaled design shop fabrication drawings using CAD, 3DCAD, flat printers and 3D printers for any and all parts as defined and required.
2.) All electrical and electronic subassemblies will be designed, engineered and shown in scaled procurement drawings and specifications using CAD, 3DCAD, flat printers and 3D printers for any and all parts as defined and required.
3.) Use of machine shop and production line tools, shapers, and welders.
4.) Use of specialty semiconductor silicone growth technologies for video screen production.
5.) Use of human hand labor for assembly, for mechanical check testing of all parts and subassemblies on human operated and automatic assembly lines.
6.) Use of human hand labor for assembly, circuit testing and operational testing of all non-semiconductor electrical parts and subassemblies on human operated and automatic assembly lines.
7.) Semiconductor controller devices pieces and assembly will be made on automatic production lines with human intervention at inspection and task changing stations.
8.) Human and automatic final product assembly of mechanical and electrical parts, testing, packing and shipping of all ev-Book products.

DRAWING PART LIST WITH TAG NUMBERS

1. FRONT COVER
2. BACK COVER
3. SPINE COVER
4. SPINE CONTAINMENT PLATE
5. SPINE SECURING STUD
6. HINGE
7. VIDEO SCREEN PAGE
8. SCREEN PAGE HOLDER
9. FULL PAGE HOLDER
10. CONTROLLER BOARD
11. -
12. SCREEN PROTECTIVE COVER
13. -
14. 5V POWER WIRE
15. -
16. VIDEO HDMI CABLE
17. -
18. POWER DISTRIBUTION BOARD
19. -
20. BATTERY
21. -
22. FEMALE CHARGER PORT
23. -
24. INCOMING 5V CIRCUIT (1)
25. -
26. 5V POWER CIRCUIT
27. -
28. MALE COMPRESSION SOCKET
29. -
30. FEMALE COMPRESSION SOCKET
31. -
32. SPINE COMPARTMENT HARNESS
33. -
34. HARNESS ACCESS COVER
35. -
36. HARNESS POSITIONING HOLE
37. -
38. HARNESS STUD NUT
39. -
40. BASE MOUNTING SOCKET
41. -
42. 2-WAY POSITION SWITCH
43. -
44. CHARGER PLUG ENTRY
45. -
46. SCREEN POWER SWITCH
47. -
48. GRAPHICS PROCESSING UNIT
49. -
50. CENTRAL PROCESSING UNIT
51. -
52. HARNESS FILLER PLATE
53. -
54. HARNESS COVER SCREW
55. -
56. MINI USB PORT
57. -
58. SOUND HEADSET PORT
59. -
60. HARNESS COVER LATCH
61. -
62. SIDE PAGE HOLDER
63. -
64. INDUSTRY RATED GPU
65. -
66. INDUSTRY RATED CPU
67. -
68. VIDEO GRAPHIC SPLITTER
69. -
70. HDMI CABLE SWITCH

I claim:

1. The present invention provides an Electronic Video Book (ev-Book) similar to form of standard hard cover print book, said ev-Book has print book characteristics comprising stand-alone flexible video screen e-Paper pages comprising:
   a) a book-like flat solid front and back covers connected with hinges to the book-like spine cover, designed to allow user to replace covers with larger or smaller covers;
   b) a book-like spine cover connected to front and back covers and to a spine harness designed to allow user to replace spine cover and harness with larger or smaller units whose width is readily variable for both physical size and number(s) of screen pages connected to the spine harness;
   c) a plurality of one or more stacked individual flexible video screen page(s) designed to allow user to replace pages supported in place on three posts fastened to the spine harness, wherein pages are clamped down in place with a plate across the top page;
   d) an electrically powered electronic semiconductor logic controller boards or CPU, designed to fit in an individual video screen page pocket and in back cover capable of generating text, video and pictures on command into multiple screen pages;
e) an electrically powered electronic semiconductor graphics controller board(s) known as GPU, interconnected to the CPU and to video screen pages with HDMI and ribbon cable(s) for quick, secure connection and assembly; wherein the CPU and Video controllers provide multiple screen connections and operation with standard graphics and video software(s);
f) a plurality of one or more low voltage high capacity battery power supplies (s) housed in the spine cover and CPU cavity in the back cover and connected to the CPU and GPU;
g) a harness container with means for housing one or more batteries designed to allow user to replace battery(s) providing low voltage electric power to one or more video screen page CPUs and GPUs;
h) the harness with means for containing, positioning, and clamping ev-Book video screen page(s) using mounting posts structurally secured with top and bottom threaded connections to allow user to replace posts with larger or smaller ones for larger and smaller video pages.

2. The ev-Book described in claim 1 wherein the main means of providing viewable information is via transporting specifically assigned, partitioned, directed and controlled digital data image files to one or a plurality of individual video screen pages secured in the spine harness comprised of:
a) text containing numbers, letters and letters comprising words;
b) pictures, graphics, symbols, paintings, sketches, photographs, charts, graphs and;
c) video clips displaying still images and/or active motion.

3. The ev-Book as described in claim 1 wherein the ev-Book houses flexible OLED, LCD or TFT light emitting chemical substrates to form flexible electronic ePaper sheets energized by the ev-Book CPU and GPU to show data files from CPU storage memory chip(s), which said pages are tunable 180 degrees back over the open front cover in a book-like character.

4. The ev-Book as described in claim 1 wherein the ev-Book cover is readily made of various reinforcing material compounds comprising the flat front and back cover surfaces each integrally hinged in place to a flat spine cover of similar material arranged to protect the user, and the video screen pages and electronics.

5. The ev-Book as described in claim 1 wherein the ev-Book back cover includes a battery and video screen page harness box mounted with one fully vacant side facing toward the body of the book to receive the three video screen page positioning holes in place over three vertically embedded cylindrical metal posts attached to bottom of both the harness and through to the back cover.

6. The ev-Book as described in claim 1 wherein the ev-Book battery and video screen page harness is readily available in varying sizes to fit corresponding varying spine sizes for interchangeable page height from 8 inches to 24 inches and page width from 8 inches to 36 inches; with matching harness battery capacity space provided and fitted with a harness top-hinged cover flap for easy accessible battery and video screens installation and removal.

7. The ev-Book as described in claim 1 wherein the ev-Book rectangular battery and video screen page harness is specifically positioned adjacent to and against the cover spine intentionally configured to safely contain and secure the low voltage battery(s) and constrain and secure the video screen page(s) to provide safety for maintenance personnel and users from electrical devices, and provide protection of the low voltage battery(s) and electrical passageway sockets on the left-hand turning surfaces of both the screen video page(s) and additional screen page holders to be used as page size selection is increased.

8. The ev-Book as described in claim 1 wherein the ev-Book battery harness and screen pages designed with structural interconnecting socket grommets to provide constant, un-interrupted passageways between and through individual stacked screen page to guide and protect thin ribbon electrical wire providing battery power flow to each screen page semiconductor CPU and CPU, and interconnecting data communication wiring between pages and CPU and GPU.

9. The ev-Book as described in claim 1 wherein a ev-Book screen page semiconductor CPU and CPU video driver are provided in one or more screen page(s) in a screen pocket cavity with a video screen page multistage touch button present in the flexible surface of the controller to:
a) first user touch action sensed by the CPU to power up and activate chosen screen starting picture, text and page backlighting;
b) second user sequential touch action to commence video graphics on screen by pressing and releasing the touch button in a sequence to activate logic to powering up the video portion;
c) third sequential touch action starts video;
d) fourth touch action pauses video;
e) fifth touch action restarts video;
f) sixth double quick touch action push turns off video portion on screen;
g) with an added larger memory and operating capacity CPU, Central processing unit housed in a cavity in the back cover for added logic power as may be needed for larger ev-Book(s).

10. An ev-Book as described in claim 1 wherein each ev-Book flexible screen page includes an embedded HDMI Video Port for connection of cables to and from the GPU for the purpose of displaying select program file(s) on one or all varying flexible video screen pages.

11. An ev-Book as described in claim 1 wherein the ev-Book spine cover contains a charging port for an external electrical transformer voltage charger to be plugged in and connect with an electrical contact on the inside harness electrical circuitry to initiate charging of the battery(s) and a Mini-USB Port for the purpose to load, reload or unload a new, different video screen page image program file(s).

* * * * *

UNITED STATES PATENT AND TRADEMARK OFFICE
CERTIFICATE OF CORRECTION

| | | |
|---|---|---|
| PATENT NO. | : 11,017,683 B2 | Page 1 of 1 |
| APPLICATION NO. | : 16/178523 | |
| DATED | : May 25, 2021 | |
| INVENTOR(S) | : Brown | |

It is certified that error appears in the above-identified patent and that said Letters Patent is hereby corrected as shown below:

On the Title Page

Item (71), Applicant "James Curran, IV, Bakersfield, CA (US)" should read --Wallace W. Scott Brown, Bakersfield, CA (US)--

Signed and Sealed this
Nineteenth Day of October, 2021

Drew Hirshfeld
*Performing the Functions and Duties of the*
*Under Secretary of Commerce for Intellectual Property and*
*Director of the United States Patent and Trademark Office*